United States Patent

[11] 3,631,229

[72] Inventors Frederick N. Bens
Hopewell Junction;
Kamal E. Dimitri, Poughkeepsie, both of N.Y.; Michael J. Moore, Winooski; John E. Tomko, Shelburne, both of Vt.; Walter W. Wajda, Hyde Park, N.Y.
[21] Appl. No. 76,922
[22] Filed Sept. 30, 1970
[45] Patented Dec. 28, 1971
[73] Assignee International Business Machines Corporation
Armonk, N.Y.

[54] MONOLITHIC MEMORY ARRAY TESTER
8 Claims, 9 Drawing Figs.
[52] U.S. Cl. .................................................. 235/153,
324/73 R, 340/172.5
[51] Int. Cl. ................................................... G01r 15/12
[50] Field of Search............................................ 324/73 R;
340/172.5; 235/153

[56] References Cited
UNITED STATES PATENTS
3,082,374 3/1963 Buuck ........................... 324/73

| | | | |
|---|---|---|---|
| 3,302,109 | 1/1967 | Jones............................ | 324/73 |
| 3,353,669 | 11/1967 | Broderick et al. ............ | 324/73 X |
| 3,492,572 | 1/1970 | Jones et al. ................... | 324/73 |
| 3,546,582 | 12/1970 | Barnard et al. ............... | 324/73 |

Primary Examiner—Charles E. Atkinson
Attorney—Sughrue, Rothwell, Mion, Zinn & Macpeak ABSTRACT: A method and apparatus are disclosed for testing on a simulated real time basis a chip or monolithic memory array. The tester is interfaced to a computer with which it communicates in a cycle steal mode of operation. The test pattern which tests the basic failure modes that can occur in the array is loaded into an area of the computer core storage whose address is given to the tester by an instruction. Another core address is given to the tester which is the area where results of the test are stored. A failure diagnosis program makes a decision as to which failure mode occurred, and the results of the diagnosis are printed out with digital coding to indicate the type of failure. Since the entire test is done in continuous cycle steal mode, the time involved is only a few milliseconds, depending on the length of the pattern.

3,631,229

MONOLITHIC MEMORY ARRAY TESTER

BACKGROUND OF THE INVENTION

1. Field of the Invention

The present invention generally relates to automatic testing equipment and procedures for electronic circuits, and more particularly to a method and apparatus for testing semiconductor chips containing an array of bistable memory circuits.

2. Description of the Prior Art

Advanced memory systems with high speeds, high-density and high-power dissipation present special problems for conventional testing techniques. To those familiar with these memory systems and the testing thereof, the reasons are obvious. High speeds limit the flexibility of the tester. A tester designed to operate the device at its designed repetition rate is of necessity limited to some few test situations and is likely to be obsoleted by any improvement in device performance. A secondary, though important, problem lies in absorbing the data at the required rate. High density is directly related to the number of tests required to completely guarantee the performance of the device and indirectly related to the probability of interactions of the chip. High-power dissipation puts a severe restriction on the testing time available to test a chip without requiring some means of cooling the chip, wafer or module.

SUMMARY OF THE INVENTION

It is therefore an object of the present invention to test a semiconductor monolithic memory array by simulating machine speeds but at the same time to provide flexible test patterns which test almost all possible failures that can occur in the array.

It is another object of this invention to provide a more efficient test program for testing possible defects in a semiconductor chip within a test time short enough so that undesirable heating of the chip does not occur.

It is a further object of the invention to test for interactions between memory cells in a monolithic array and to verify that particular cells within the array will accept and read data at a prescribed rate.

According to the present invention, the foregoing and other objects are attained in a preferred embodiment by providing a monolithic array tester under the control of a programmable computer. The tester communicates with the computer in a cycle steal mode of operation through an interface logic that provides the timing and control needed to read information directly from, or write information into, the computer's core storage. The test pattern is loaded into an area of the core storage, and the address is given to the interface logic by an instruction. The pattern consists of words which, when decoded, set up programmable pulse generators to provide the proper stimulus to the chip under test. The interface logic also includes decision logic for determining whether the test was a pass or fail, and another core address is provided to the interface logic which is the area where the results of the test are stored. The pulse generators are programmable to the four conditions. Discriminators with a strobe input are used to detect output currents of the device under test. A programmable delay triggers the discriminators at any point in time during the output pulse. A digital-to-analog converter provides the conversion of digital information from the interface logic to the proper analog voltage levels required to control the direct current bias to the chip, the pulse width and up and down levels to the pulse generators, and the strobe delay to the discriminators. From the test results stored in the computer core storage, a failure diagnosis program makes a decision as to which failure mode occurred. The result of the diagnosis is printed out with digital coding to indicate the type of failure.

BRIEF DESCRIPTION OF THE DRAWINGS

The specific nature of the invention, as well as other objects, aspects, uses and advantages thereof, will clearly appear from the following description and from the accompanying drawings, in which.

DESCRIPTION OF THE PREFERRED EMBODIMENT

Figure 1:
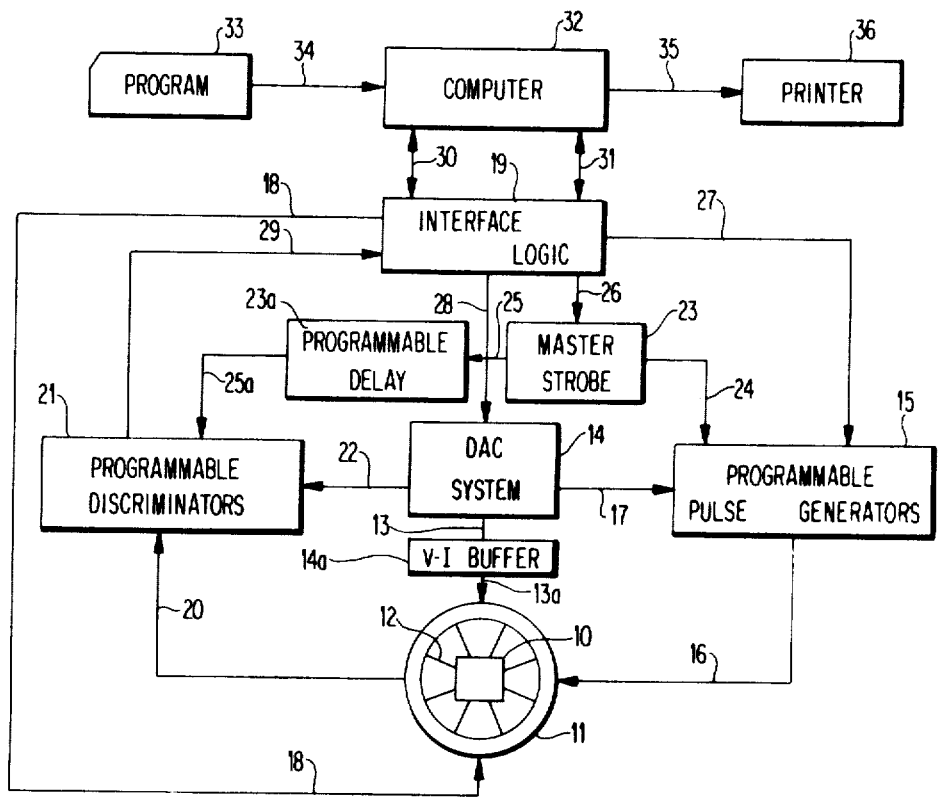
FIG. 1 is a block diagram of the monolithic array tester according to the invention.

Referring now to the drawings, and more particularly to FIG. 1, a memory chip 10 is shown connected to a probe 11 by means of a plurality of input leads 12 for purposes of testing. Assuming a 256 cell (16×16) chip, only eight address bits are required for the specific ships for which the tester is contemplated. This is because each chip contains a built-in decoder. Consequently, there are a total of eight external address connections 12 to the chip 10, four in the X direction and four in the Y direction, each set of four lines being connected to a decoder having 16 outputs. Other external lines 12 include the select line, the data in and out lines, and various reference and bias voltage lines.

The chip 10 is provided with the required direct current bias over line 13a from the voltage-current (V-I) buffer system 14a. Timing, control, data and address inputs to the chip are provided by the programmable pulse generators 15 over line 16. The programmable pulse generators 15 in turn receive voltages over line 17 from digital-to-analog converter system 14 which control pulse width, up level, down level and a delay time from the master strobe 23. X, Y, Z control of the probe 11 via program control is transmitted over line 18 from interface logic 19. The data output connection from the probe 11 to the measuring system is made by line 20 to the programmable discriminators 21. The digital-to-analog conversion system 14 also provides programmed reference voltages for strobe delay of discriminators 21 on line 22.

The master strobe 23 provides the basic triggering time ($T_o$) pulse for the programmable pulse generators 15 and discriminators 21 via the programmable electronic delay 23a over lines 24 and 25, respectively. The master strobe 23 in turn receives the computer triggering system clock over line 26 by way of interface logic 19.

The interface logic 19 also provides the pulse pattern control over line 27 to the programmable pulse generators 15 and the digital input over line 28 to the digital-to-analog conversion system 14. The outputs from the programmable discriminators 21 are transmitted over line 29 to the decision logic in the interface logic 19, for the pass or fail decision. The interface logic communicates over two channels 30 and 31 with the computer 32. The first channel 30 provides direct program control to operate probe 11 DAC system 14 and V-I buffer 14a. The second channel 31 is the cycle steal channel. This channel is a high-speed data channel used to transmit bit patterns to the tester and to read back data from the interface.

The user's input to the test system is represented by the program 33 fed into the computer 32 over the line 34. The computer operates on the pass/fail test results with a diagnostic program and makes a decision as to which failure mode occurred. The test results are transmitted over line 35 to printer 36 where the result of the diagnosis is printed out as an 16×16 matrix with digital coding to indicate the type of failure. Thus, there is provided a permanent record for the retention of data for subsequent analysis.

Figure 2:
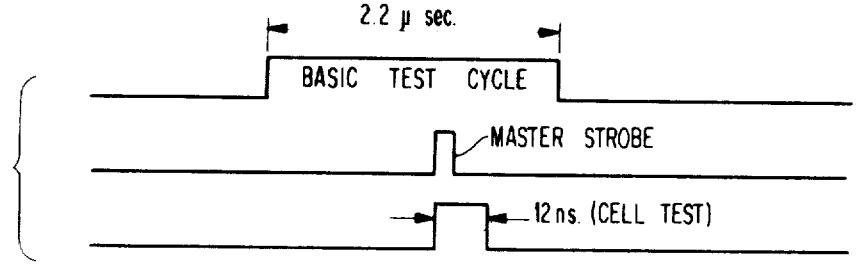
FIG. 2 is a timing diagram illustrating the basic test cycle of the tester.

A particular advantage of the tester is that it can use a computer having a relatively slow cycle time (2.2 microseconds) to test on a simulated real time basis a monolithic memory array having a relatively fast access time (6 nanoseconds). FIG. 2 shows the basic system timing. Sometime during the 2.2 microsecond test cycle which corresponds to the computer's cycle time, the master strobe pulse is generated. This in turn initiates a 12 nanosecond cell test pulse. It will be appreciated that since the memory chip will be expected to operate on a 6 nanosecond access time in actual use, it is important during testing to operate the chip on the same time basis. However, since the cycle time of the computer is much greater than the access time of the memory array, there is provided means to access the chip twice within a single computer cycle time. This so-called simulated real time testing is accomplished by the use of two fast analog switches controlling the pulse width and the delay time of one of the programmable pulse generators 15.

Figure 3:
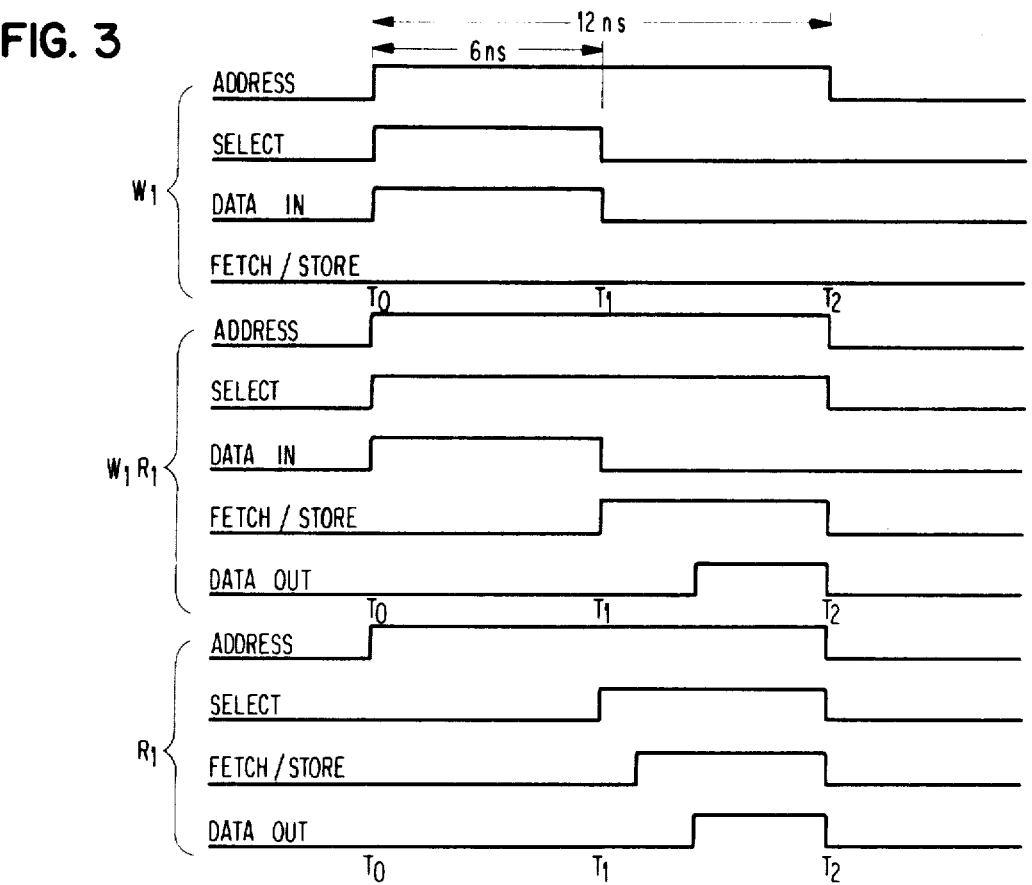
FIG. 3 is a timing diagram illustrating the memory cell test timing.

The cell test timing for three conditions of test is shown in FIG. 3. Each of the timing diagrams labeled Address, Select, Data In, Fetch/Store, and Data Out correspond to signals appearing on the external connecting lines 12 to the chip 10. The digital-to-analog conversion system 14 and the programmable pulse generators 15 in combination with the two fast analog switches generate three possible select signals:

1. A 6 nanosecond pulse beginning at $T_0$ and ending at $T_1$ and specifying a write operation without a following read operation.

2. A 12 nanosecond pulse beginning at $T_0$ and ending at $T_2$ for specifying a write operation followed by a read operation.

3. A 6 nanosecond pulse beginning at $T_1$ and ending at $T_2$ and specifying a read operation without being preceded by a write operation.

This cell test timing is used in the specific test pattern employed in the invention to detect the following failure modes:

STUCKS

In this failure mode, a cell remains in one stable state regardless of stored information. These are coded as follows:

SO—Stuck in "0" state.
S1—Stuck in "1" state.

MULTIPLE ADDRESSING (MA)

This failure mode occurs when writing into one cell address causes the information to be written into two or more cells.

DISTURBS

This failure mode is manifested when an operation on cell "A" affects the contents of cell "B." A number of variations are possible and are coded below:

$W_1D_1$ Writing a "1" on A disturbs a "1" in B.
$R_1D_1$ Reading a "1" on A disturbs a "1" in B.
$W_0D_1$ Writing a "0" on A disturbs a "1" in B.
$R_0D_1$ Reading a "0" on A disturbs a "1" in B.
$W_1D_0$ Writing a "1" on A disturbs a "0" in B.
$R_1D_0$ Reading a "1" on A disturbs a "0" in B.
$W_0D_0$ Writing a "0" on A disturbs a "0" in B.
$R_0D_0$ Reading a "0" on A disturbs a "0" in B.

BIT RECOVERY (BR)

Assuming all bits on a word line except cell "A" have the same state, this failure mode occurs when cell "A" cannot be read correctly.

The test pattern according to the invention will detect these failure modes in the minimum number of test cycles with the following qualifications. Faults which can be caused by one operation and corrected by the next operation are not detected. Multiple Addressing is assumed to be bilateral. Again, assuming a 256 cell memory chip (16×16array), the cells are addressed progressively from cell 000 to cell 255. The test pattern is as follows:

Step 1.   Write "1" into each cell (initialization).
Step 2.   Read "1," write "0," read "0," write "1" into each cell.
Step 3.   Read "1," write "0" into each cell.
Step 4.   Read "0," write "1," read "1," write "0" into each cell.
Step 5.   Read "0," write "1" into each cell.

The output data from the memory array resulting from this test pattern is analyzed as follows:

Step 2.   Reading a "1" tests the cell's ability to maintain the "1" state and parts of the interactions or disturbs of cell in the "1" state. Reading a "0" tests the cell's ability to be switched to the "0" state in a field of "1'S."

Step 3.   Reading a "1" tests multiple addressing due to decoding circuitry malfunction for the "1" state and the remaining part of the interactions or disturbs of cells in the "1" state.

Step 4.   Reading a "0" tests the cell's ability to maintain the "0" state and part of the interactions or disturbs of cells in the "0" state. Reading a "1" tests the cell's ability to be switched to the "1" state in a field of "0'S."

Step 5.   Reading a "0" tests multiple addressing due to decoding circuitry malfunction for the "0" state and the remaining part of the interactions or disturbs or cells in the "0" state.

The foregoing is summarized in table 1 below:

TABLE 1.—CHIP TEST PATTERN

| Input Control | Address | Failure category | Failure modes detected (initialization) | Number of test cycles |
|---|---|---|---|---|
| W1 | 0—255 | | | 256 |
| R1, W0R0, W1 | 0—255 | A, B | S0, W1D1, R1D1, W0D1, R0D1, S1, Bit Recovery. | 256 x 3 |
| R1, W0 | 0—255 | C | S0, MA, R1D1, W0D1, R0D1, W1D1 | 256 x 2 |
| R0, W1R1, W0 | 255—0 | A′, B′ | S1, R1D0, W0D0, R0D0, W1D0, S0, Bit Recovery. | 256 x 3 |
| R0, W1 | 255—0 | C′ | S1, MA, R0D0, W1D0, R1D0, W0D0 | 256 x 2 / ¹ 2,816 / ² 1,536 |

¹ Total number of test cycles.
² Total number of Reads.
*Brackets indicate patterns are exercised as a group on each address.

NOTE.—Total test time a 2.2 μs./cycle, 6.2 ms.

Referring to table 1, a cell which fails to read the data indicated in the control column belongs in the fail category associated with that reading. The fail category is the set of all failure modes in the "Failure Modes detected" column. A single reading therefore may not pinpoint the exact failure mode. However, six readings are taken per cell.

Analyzing all readings on a cell together we find:

TABLE 2

| | A | B | C | A′ | B′ | C′ |
|---|---|---|---|---|---|---|
| S0 | Fails Categories | X | X | X | | |
| S1 | Fails Categories | | X | | X | X |
| BR | Fails Categories | | X | | | X |
| MA | Fails Categories | | | X | | | X |
| $D_1$ | Fails Categories | X | X | | | |
| $D_0$ | Fails Categories | | | | X | | X |

Disturbs may be further classified by a secondary pattern to determine which cell is causing the disturb and by which operation. Data analysis is performed by a Failure Diagnosis Subroutine callable from the user's program. The format is as follows:

Call FDIAG (OUT)

Where OUT is the name of the output array used in the Test subroutine. The objectives of the FDIAG subroutine are:

1. Rearrange raw data into usable from i.e. 256 words of six data bits each.
2. Compare data as shown in table 2.
3. Printout chip failures as shown in output format.

OUTPUT FORMAT

The printout shows a 16×16 matrix.

A good cell is denoted by an asterisk.

A defective cell is denoted by a numerical error code indicating a specific failure mode.

Figure 4:
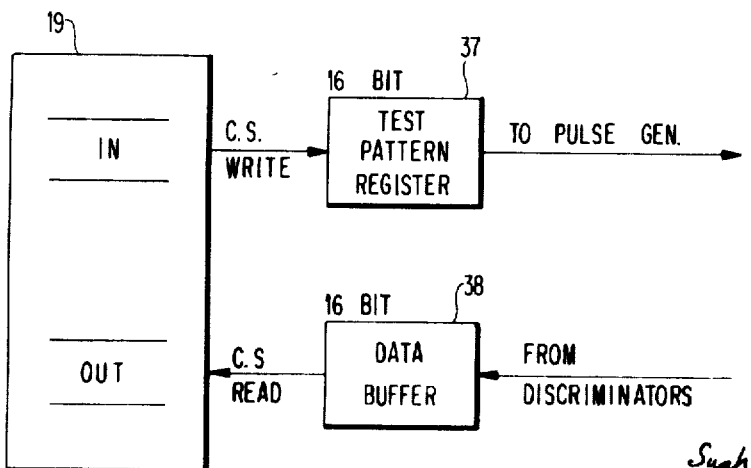
FIG. 4 is a block diagram of the interface logic in the cycle steal mode.

The interface logic 19 has two sections. The first section is a digital-to-analog conversion section which communicates between the computer 32 and the digital-to-analog conversion system 14 using a direct write (no interrupt level). It takes three machine cycles or 6.6 microseconds per channel to update the digital-to-analog converters. The second section of the interface logic is the cycle steal section. After all channels on the digital-to-analog converters have been updated, the cycle steal write section starts sending information using one machine cycle or 2.2 microseconds to strobe the master strobe 23 and select which pulse generators 15 are on or off from the strobe gate. This is accomplished in part by means of a 16-bit test pattern register 37 shown in FIG. 4. The cycle steal section of interface logic 19 also uses one cycle steal read to transmit 16 bits of information (when it is ready) back to the computer 32. This data is accumulated in the 16-bit data buffer 38 in the form of pass/fail, a logical "0" for pass and a logical "1" for fail, regardless of whether the read was a one or zero.

Figure 5:
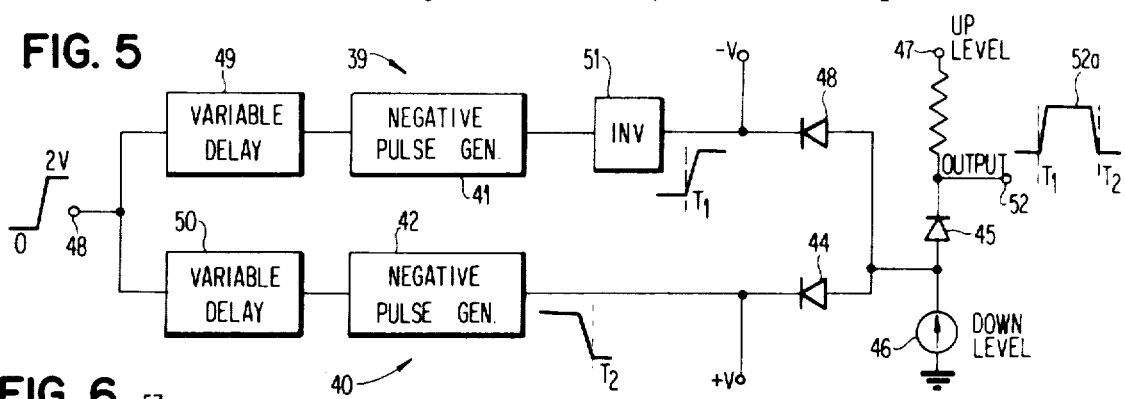
FIG. 5 is a partially block and partially schematic diagram of a programmable pulse generator.

An example of the programmable pulse generators is shown schematically in FIG. 5 The purpose of this circuit is to generate accurately timed, variable width and variable amplitude pulses to drive the memory array under test. The generator consists of two pulse generating channels 39 and 40, each having a snap diode 41 and 42, respectively, acting as a pulse generator. The snap diode outputs are fed into a diode bridge comprising diodes 43, 44 and 45. Also feeding the bridge is an adjustable current source 46 which is controlled by a voltage supplied by the digital-to-analog conversion system 14. The voltage at terminal 47 is also supplied by conversion system 14 and, together with the voltage controlling current source 46, the up and down levels and hence the amplitude of the output pulse is controlled. The width of the output pulse is determined by the time difference of the leading edges of the inputs from channels 39 and 40. Both channels receive the same master strobe input at terminal 48. This input is fed to programmable variable delay circuits 49 and 50, respectively, the nature of which will be described in more detail in a latter section of this specification. Snap diode pulse generators 41 and 42 when triggered by a positive going pulse from their respective delay circuits 49 and 50 produce negative output pulses. In channel 39, this negative output pulse is first inverted by inverter 51 to produce a positive going pulse at time $T_1$ and then fed to the diode bridge. The negative going output at time $T_2$ of generator 42, on the other hand, is fed directly to the diode bridge with the result that a composite, accurately timed output pulse appears at output terminal 52.

Figure 6:
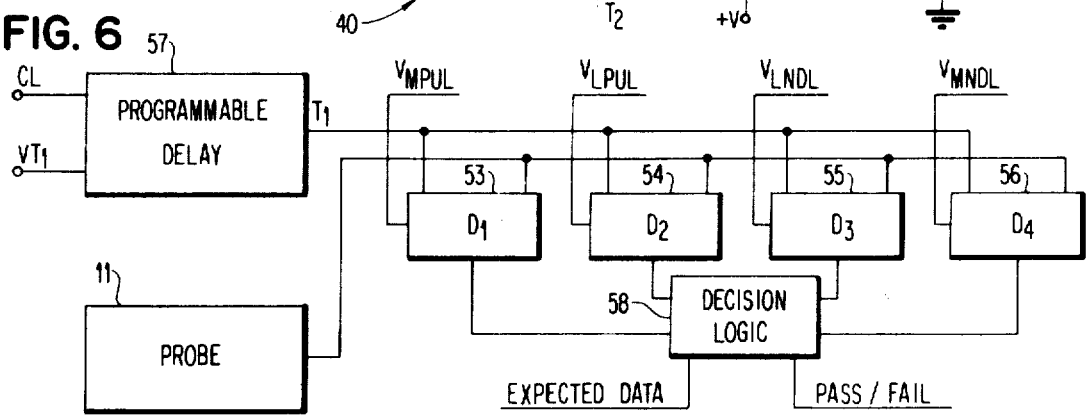
FIG. 6 is a block diagram of the programmable discriminators used to measure the output of the device under test.

The measurement system which includes the programmable discriminators 21 is shown in FIG. 6. Four tunnel diode discriminators 53, 54, 55 and 56 sense the data on the output line 20 from the probe 12. These units compare the output pulse at a point in time determined by the programmable delay 57 to predetermined levels set by the digital-to-analog conversion system 14. The discriminators are programmed to MPUL, LPUL, LNDL, and MNDL limits. When the sum of the strobe current from the delay 57, the reference current from the digital-to-analog conversion system 14 and the data current on line 20 exceeds the peak current of the diode, a 3-volt pulse of approximately 50 nanoseconds width is produced on the discriminator output. The four outputs are compared in decision logic 58 with the expected data to generate a pass/fail output. For example, if an $R_1$ pattern was used and all discriminators except the one programmed to MPUL were fired, a "1" is recorded in the data buffer 38, otherwise a "0" is recorded. A similar procedure is used to detect a pass "0" condition.

Figure 7:
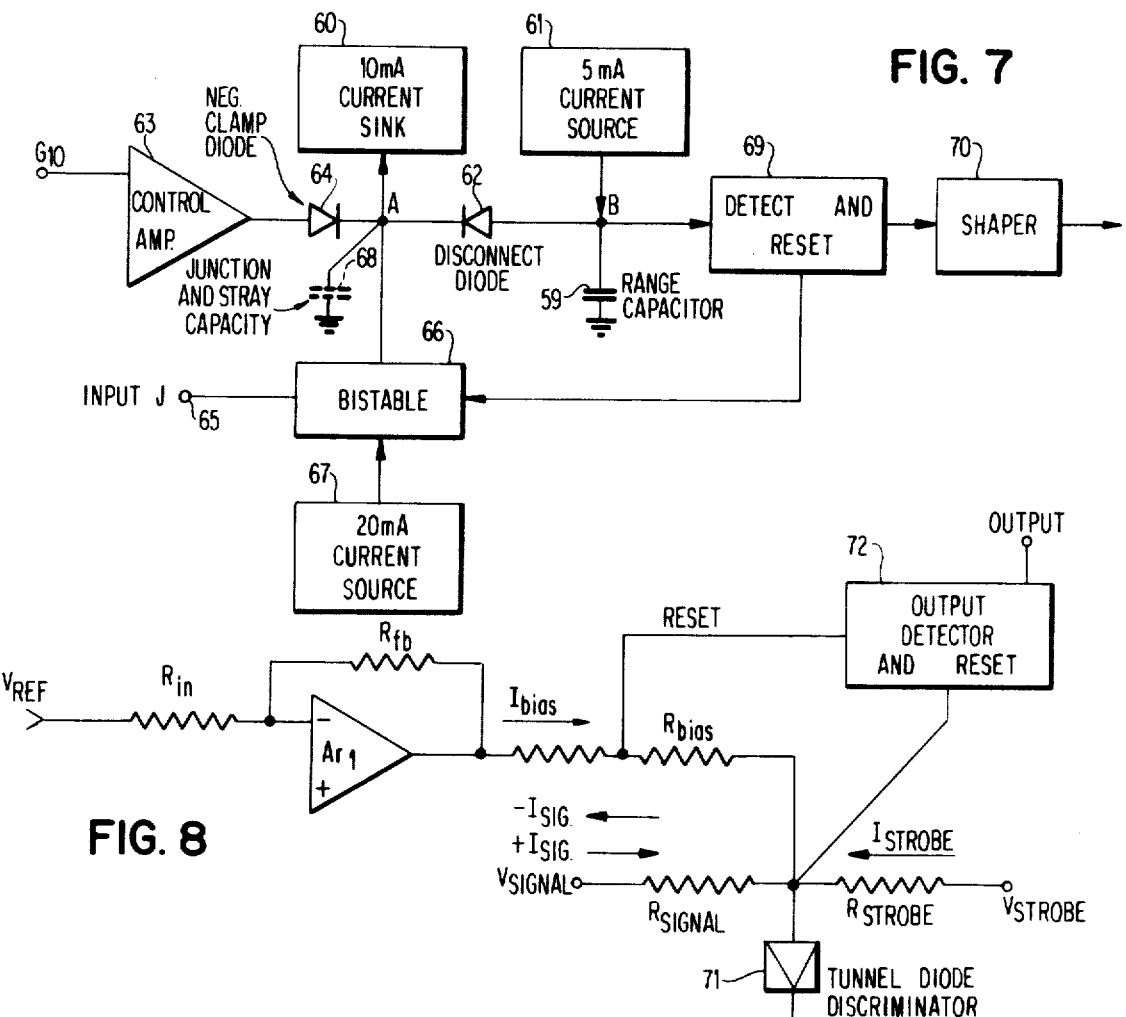
FIG. 7 is a partially block and a partially schematic diagram of the electronic delay used in the programmable discriminators.

An electronic delay which may be used in conjunction with both the programmable pulse generators 15 and discriminators 21 is shown in FIG. 7. This circuit has an output whose time of occurrence with respect to the input is a linear function of a programmed control voltage. The delay is obtained by charging capacitor 59 with a constant current. The circuit uses two voltage ramps. One occurs at node A and the other occurs at node B. The ramp at node B is a delay ramp, while node A does not affect the delay. Before the circuit is triggered, the 10 milliamp current sink 60 absorbs all the current from the 5 milliamp current source 61 through the disconnect diode 62. The control amplifier 63, used to set a negative potential at node A, supplies another 5 milliamps through the negative clamp diode 64. When an input signal at terminal 65 triggers the bistable 66 to its ON state, approximately 17 milliamps of current is switched into node A from the 20 milliamp current source 67. The bistable 66 requires 3 milliamps to keep it in its ON condition. The 17 milliamps flowing into node A from the bistable 67 supplies the 10 milliamps needed to satisfy the current sink 60 with 7 milliamps excess to charge the stray capacitance 68 at node A. This causes the first voltage ramp to rise. This in turn back biases both the negative clamp diode 64 and the disconnect diode 62. When the disconnect diode (so called because it CV/I the second ramp from disturbances in preceding stages) is back biased, current from the 5 milliamp source 61 is switched into capacitor 59 at node B. Before the disconnect diode was back biased, node B was at the same potential as the output of the control amplifier 63. As capacitor 59 charges, the second ramp rises from that negative level. The time it takes the 5 milliamp source to charge the capacitor up to 0 volts (the point of detection) is the time delay and is given by:

$$T=CV/I$$

where $T$ is the time in seconds, $C$ is the capacitance in farads, $V$ is the charge on capacitor 59 in capacitor voltage in volts, and $I$ is the charging current in amperes. The detector circuit 69 triggers the shaper 70 while at the same time resetting bistable 66. The 17 milliamps of current is then switched away from node A. Both ramp capacitances discharge, and the circuit returns to its quiescent state.

Figure 8:
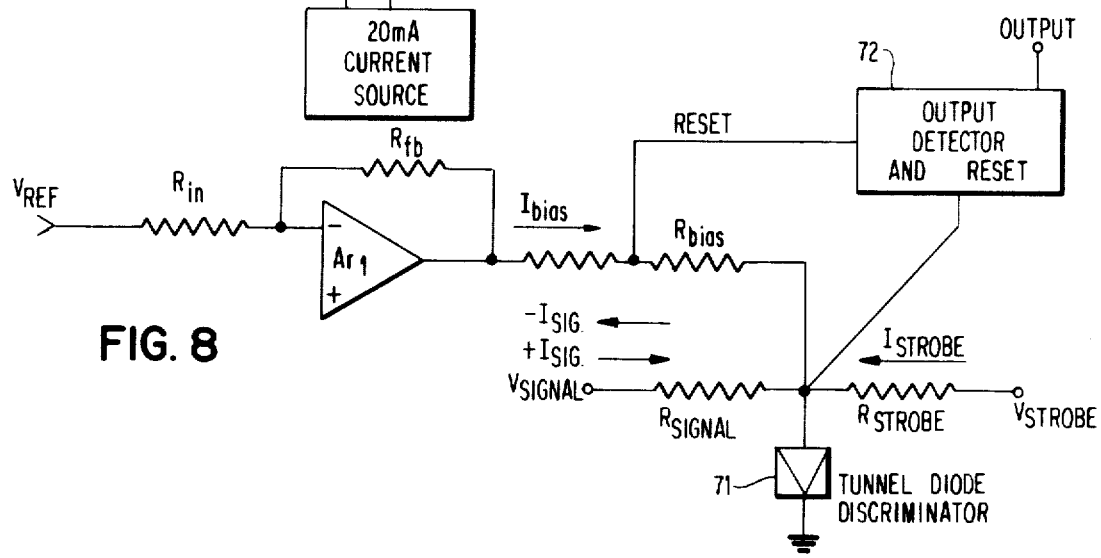
FIG. 8 is a simplified schematic diagram of a discriminator.

An exemplary discriminator is shown in more detail in FIG. 8. Basically, the discriminator is a strobed, monostable, tunnel diode 71. There is a controlled time relationship between the input stimulus which generates the strobe and the signal under test. If the signal level at the time of strobe occurrence is greater than the reference level, the tunnel diode 71 will switch to its high-voltage state. The detector 72 senses this change of state, triggers the output and resets the tunnel diode to its low-vohtage state.

Figure 9:
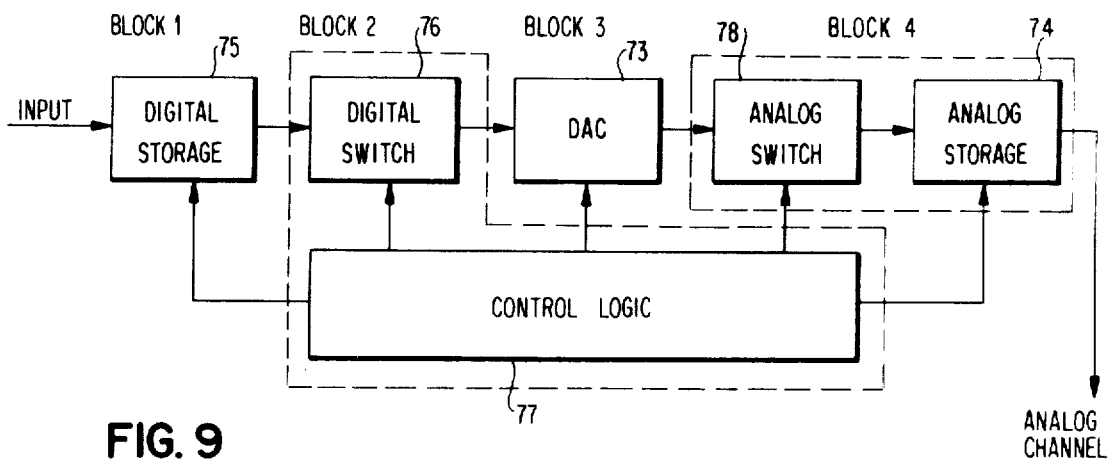
FIG. 9 is a block diagram of the digital-to-analog conversion system.

The digital-to-analog system 14 which provides the reference and control voltages to the programmable pulse generators 15 and discriminators 21 as well as the bias, voltages to the chip 10 under test is shown in more detail in FIG. 9. This system is basically a multichannel digital-to-analog conversion system comprising a single digital-to-analog converter 73 and multiple sample-and-hold circuits in the analog storage 74. There is one sample-and-hold circuit per output channel in analog storage 74. The system works on a time sharing basis to continuously multiplex many digital data inputs to the single, parallel digital-to-analog converter 73, sequentially in time, and synchronously connecting the output of the converter to the appropriate sample-and-hold circuit in the analog channels. Thus, the digital input data and the output analog values must not only be continuously multiplexed but also stored. To achieve this, four major functional blocks delineated in FIG. 9 are required. Block 1 includes the input digital storage 75 such as registers, core memory or monolithic memory. Block 2 comprises the digital switching 76 and the timing and control circuits 77. Block 3 is the digital-to-analog converter 73. Block 4 includes analog switching 78 controlled by logic 77 and the analog storage 74.

It will be apparent that the embodiment shown is only exemplary and that various modifications can be made in construction and arrangement within the scope of the invention as defined in the appended claims.

We claim:

1. An apparatus for testing on a simulated real time basis a monolithic memory array comprising:
   a. a programmable computer having a test pattern loaded into its memory,
   b. an interface which communicates with the computer read or write information in the computer memory,
   c. programmable pulse generator means responsive to words in said test pattern read by said interface for generating the proper stimulus to an array under test,
   d. a probe connected to the output of said generator means and adapted to feed pulses generated thereby to a monolithic memory array, and
   e. programmable discriminator means connected to receive the output pulses from said probe and responsive to words in said test pattern read by said interface for generating a pass or fail output in timed relationship to the input stimulus generated by said generator means.

2. An apparatus as recited in claim 1 further comprising digital-to-analog conversion means connected to said interface for receiving digital words read from said computer memory and generating analog voltage levels to control said generator means and said discriminator means.

3. An apparatus as recited in claim 2 wherein said conversion means is also connected to said probe and generates bias voltages according to the nature of the memory array under test as specified in the computer program.

4. An apparatus as recited in claim 3 wherein said interface is directly connected to said probe thereby permitting address control of the strobe via the computer program.

5. An apparatus as recited in claim 4 wherein the output of said discriminator means is connected to said interface and the test results are read into the computer memory.

6. An apparatus as recited in claim 5 wherein said computer employs a failure diagnosis program to make a decision as to which types of failure modes occur and further comprising a printer connected to said computer to print out the results of the diagnosis with digital coding to indicate the type of failure.

7. An apparatus as recited in claim 1 wherein the computer cycle time is substantially greater than the access time of the memory array under test and further comprising master strobe means connected to said interface and responsive to the computer clock for generating a strobe during the computer cycle time to operate said memory array on a simulated real time basis.

8. An apparatus as recited in claim 7 wherein said generator means and said discriminator means are responsive to said strobe and to words in said test pattern to access said memory array twice within a single computer cycle to selectively provide a write operation without a following read operation, a write operation followed by a read operation, or a read operation without being preceded by a write operation.

* * * * *